Patented Nov. 22, 1938

2,137,274

UNITED STATES PATENT OFFICE 2,137,274

CELLULOSIC FILM AND METHOD OF MAKING SAME

Donald E. Drew, Kenmore, N. Y., assignor to E. I. du Pont de Nemours & Company, Wilmington, Del., a corporation of Delaware No Drawing. Application October 22, 1936, Serial No. 107,056

11 Claims. (Cl. 91—68)

This invention relates to improvements in smooth, non-fibrous, non-porous sheets, films and pellicles and the method of making the same. More particularly, the invention relates to the production of cellulosic pellicles, especially water sensitive films formed from aqueous alkaline cellulosic solutions, whereby to greatly enhance certain physical characteristics and consequently, their utility to manufacturer, converter and consumer. The invention will be described in terms of regenerated cellulose sheets and films although it is to be understood that this is illustrative and not limitative.

Regenerated cellulose, if manufactured in the pure form, is characterized by great brittleness and lack of flexibility. Cellulose, however, has a strong affinity for water, and even in the absence of any other softening material will absorb a substantial amount of water from the surrounding atmosphere. If the surrounding atmosphere is of high relative humidity, such as around 95%, the water absorbed contributes sufficient softness so that only comparatively small amounts of additional softener are necessary to make the film commercially useful. In order, however, to make the film flexible and non-brittle at all humidities, a substantial amount of a relatively non-volatile hygroscopic softener, such as glycerin, is customarily impregnated into the film. When this is done, the moisture absorbed by the film at high relative humidities tends to make it more flexible than is actually necessary. However, this does no particular harm except for the fact that it very markedly increases the tendency of superimposed sheets to stick together, particularly when pressure, even though moderate, is applied. This tendency has been a problem affecting the commercial handling of the film for a great many years.

In order to overcome this difficulty, it has been proposed to apply to the surfaces of the film a thin, tenuous coating or "sizing", reducing the tendency of stacked sheets to stick together. Heretofore, most of these sizes or anti-sticking agents have been only of limited effectiveness in preventing sticking and/or are not very receptive to water soluble glues customarily used in the fabrication of packages or the like and/or have a tendency, when applied in too large quantities, of causing haze or blush in the film.

It is therefore an object of this invention to produce thin, non-fibrous, substantially non-porous sheets and films of improved resistance to sticking together and at the same time with little or no impairment of glue receptivity and a minimum amount of haze or blush.

It is a further object to produce such sheets or films having an improved resistance to sticking together in atmospheres of high relative humidity and/or when impregnated with large quantities of a softening agent.

It is a still further object to produce such sheets or films of regenerated cellulose or other water sensitive cellulosic materials.

It is a still further object to produce new sizing materials for such sheets and films.

Other objects will appear hereinafter.

The objects of this invention are accomplished by sizing such sheets or films with a thin, tenuous coating comprising a waxy amine, preferably in the form of a salt such as the hydrochloride, acetate or lactate, applied from aqueous colloidal solution or dispersion.

According to the preferred form of this invention, the sizing or anti-sticking agents are applied to transparent regenerated cellulose sheets while such sheets are in the gel state. Preferably this is accomplished by passing the regenerated cellulose in continuous form through a bath containing the sizing or anti-sticking agent in the desired concentration. This is most conveniently done just prior to the drying operation and at the same time as impregnation with a softener, such as glycerin. Before entering the drier, the excess anti-sticking agent, together with the excess softener solution, may be removed by suitable squeeze rollers, scraper rods, doctor knives or the like. The amount of anti-sticking agent which is applied is controlled by adjusting the concentration of the anti-sticking agent in the treating bath, or by varying the amount of excess removed. If it is desired to apply the anti-sticking agent separately, the pellicle may be treated with a softener bath, the excess removed as indicated above and then the solution or dispersion of the anti-sticking agent applied by dip rolls, sprays, or the like. The invention is also applicable to the production of film containing no softener, such softener free film being used for certain special purposes.

In general, waxy amines which are applicable in the practice of this invention are those that are solid at ordinary temperatures and whose salts can form a stable, aqueous, colloidal solution. Preferably only very minute quantities of such amines are applied to the transparent regenerated cellulose pellicle. Such substances, after drying in the pellicle, will usually and preferably amount to less than 2% of the product and may even amount to as little as a few hundredths per cent.

In carrying out the sizing treatment, it is essential that the solution be so prepared, that the quantity be so controlled and that drying be so carried out that the final product is substantially not inferior to similar unsized products, particularly in the retention of transparency and brilliance and receptiveness to the usual aqueous adhesives. Furthermore, the product should resist cohesion, such as caking of stacked sheets when stored under pressure and/or exposed to atmospheres of high humidity, as much or more than similar unsized sheets even though the product may contain as much as twice the quantity of softening agent as the unsized product. For this reason many restrictions are placed on the sizing or anti-sticking composition.

In the practice of this invention, as mentioned above, there may be used waxy amines which are solid at all ordinary temperatures (e. g. 25° C.) and preferably having a melting point above 40° C. and salts of such amines. Aliphatic amines and salts thereof are particularly suitable. Of these, the most easily available and suitable are octodecylamine (sometimes called stearylamine) and cetylamine, present in aqueous, colloidal solution in the form of the hydrochloride, acetate or lactate. The amount of such waxy material in solution necessary to form the desired concentration in the final product is customarily between 0.01% and 1.00% and preferably between 0.05 and 0.2%. Other solid waxy amines are also suitable, but the two mentioned above are the most commercially available.

The sizing solution may be prepared by any suitable method well known in colloid chemistry, such as grinding the waxy amine salt in a colloid mill and subsequently dispersing in water. A preferred method is as follows: A quantity of the waxy amine, such as octodecylamine (sometimes called stearylamine) or cetylamine, is dissolved in ethyl or methyl alcohol at 50° C. to form a 25% solution. To this is added a sufficient quantity of hydrochloric, lactic or acetic acid to form the corresponding salt. The concentrated solution thus formed is then dispersed in an aqueous bath containing 7.5% glycerin to form a 0.1% colloidal solution of the waxy amine. The film is passed through this bath, preferably while in the gel state, dried and wound up into rolls.

As has been indicated above, cellulosic pellicles of the type described which are dense, non-fibrous and substantially impermeable possess a remarkably smooth surface. Customarily such pellicles are dried by passing them in a continuous manner over a series of drier rollers, and the surface of these rolls is usually smooth so that the surface of the pellicle will not be marred during its passage thereover. As the pellicle is dried, it tends to shrink in width, and with smooth rollers the shrinkage is more or less unrestricted in the case of the usual untreated pellicle so that considerable loss in width is experienced. It might be expected therefore that a pellicle treated in accordance with the present invention to improve the sticking resistance would present a still smoother surface to the drier rollers and would result in even greater shrinkage as the pellicle is dried. It has been found, however, and suprisingly so that many of the sizing or other anti-sticking compositions within the scope of the invention are capable of preventing this shrinkage to such an extent as will result in substantially no greater loss in width than would be experienced if no sizing treatment were given. This can be done without sacrificing the improvement in sticking resistance and receptivity of the pellicle to the usual aqueous adhesives, such as one containing dextrin, calcium chloride and glycerin.

It will be seen from the foregoing that in the preparation of the product it is necessary to overcome certain obstacles which are not encountered in any other product now known. Whereas stacks of transparent regenerated cellulose sheets are readily caked or stuck together by increases in moisture or pressure, paper, being porous, less hygroscopic and relatively rough in surface, exhibits no such action. Even the glassine papers which most nearly approach transparent regenerated cellulose film are free from caking or sticking. Cohering and gluing of transparent regenerated cellulose sheets differ widely from any such problem which has been encountered in the paper field. Even the densest of paper is sufficiently porous so that a wide variety of adhesives, for example starch, casein, dextrin and gelatin agglutinants provide suitable adhesion. Plain transparent regenerated cellulose sheets, on the other hand, are smooth, non-fibrous and impervious to the usual colloidal agglutinant products and hence require specially compounded adhesives to secure proper adhesion of the smooth and substantially impermeable surface. Therefore, sizing or anti-sticking agents which would in no way affect the gluing properties of glassine paper, for example, would so prevent the wetting and adhesion of an equeous adhesive on the surface of transparent regenerated cellulose pellicles that no useful adhesion whatsoever would result. It thus becomes apparent that the sizing or anti-sticking agents which will improve the sticking resistance of regenerated cellulose pellicles and at the same time permit the pellicles to remain receptive to aqueous adhesives which are satisfactory for use with untreated pellicles constitutes an outstanding contribution to the art. Needless to say, there are many uses to which cellulosic pellicles of the type described might be put wherein the anti-sticking characteristic is of major import while the receptivity to aqueous adhesives is of little concern. In such cases, a pellicle having improved sticking resistance, regardless of its receptivity to aqueous adhesives, will be useful, and the production of such pellicles comes well within the scope of the present invention.

Likewise, the adhesion of printing inks to surfaces of transparent, regenerated cellulose pellicles is often greatly impaired except where the gluable compositions of the present invention are employed.

Certain treatments have been developed for imparting moistureproofness and/or waterproofness to transparent regenerated cellulose sheets. While these treatments may generally be applied to highly softened sheets to produce transparent sticking-resistant products, they invariably result in products which cannot be glued with commercial aqueous adhesives. Furthermore, such processes require a second step, as of applying lacquers after the film has been dried and wound up. One very practical feature of the process of this invention is that it may be carried out at practically no increase in cost and without any alteration in the machine usually used for producing transparent regenerated cellulose sheets or in the method for subsequent handling by the manufacturer or converter or consumer.

Although this invention has been described in terms of sizing gel film, it may also be applied to film which has been dried and rewetted. However, this procedure is generally to be avoided since it necessitates an additional step in the manufacture, thus increasing the cost. It is also applicable to other smooth, non-fibrous, non-porous sheets and films which, because of their high content of softener, have a tendency to stick together, particularly water sensitive pellicles cast from aqueous or alkaline aqueous cellulosic solutions, including lowly substituted cellulose ethers, esters and ether-esters, such as glycol cellulose, methyl cellulose, ethyl cellulose, cellulose glycolic acid, and cellulose phthalic acid.

It is to be understood that all other variations or modifications which conform to the spirit of the invention are intended to be included within the scope of the claims.

I claim:

1. Regenerated cellulose film containing a softener and sized with a water-soluble salt of octodecyl amine.

2. Regenerated cellulose film containing glycerin and sized with octodecyl amine acetate.

3. The method comprising regenerating cellulose film from an aqueous solution, and treating said film with an aqueous solution of a softener and a water-soluble salt of octodecyl amine.

4. The method comprising regenerating cellulose film from an aqueous solution, and treating said film with an aqueous solution of glycerin and octodecyl amine acetate.

5. A moisture permeable transparent film cast from an aqueous cellulosic solution, said film containing a material taken from the class consisting of those normally solid primary alkyl amines of high molecular weight hydrocarbons which have at least one water-soluble salt, and water-soluble salts thereof, said material being present in sufficient amount to prevent any appreciable adhesion of said films to each other and in insufficient amount to impair the transparency of said films.

6. A moisture permeable transparent film cast from an aqueous cellulosic solution, said film containing a softener and a material taken from the class consisting of those normally solid primary alkyl amines of high molecular weight hydrocarbons which have at least one water-soluble salt, and water-soluble salts thereof, said material being present in sufficient amount to prevent any appreciable adhesion of said films to each other and in insufficient amount to impair the transparency of said films.

7. A moisture permeable transparent regenerated cellulose film containing a material taken from the class consisting of those normally solid primary alkyl amines of high molecular weight hydrocarbons which have at least one water-soluble salt, and water-soluble salts thereof, said material being present in sufficient amount to prevent any appreciable adhesion of said films to each other and in insufficient amount to impair the transparency of said films.

8. A moisture permeable transparent regenerated cellulose film containing a softener and a material taken from the class consisting of those normally solid primary alkyl amines of high molecular weight hydrocarbons which have at least one water-soluble salt, and water-soluble salts thereof, said material being present in sufficient amount to prevent any appreciable adhesion of said films to each other and in insufficient amount to impair the transparency of said films.

9. The method comprising coagulating non-fibrous, non-porous cellulosic film from an aqueous solution, and treating said film with an aqueous solution of a water-soluble salt of a normally solid primary alkyl amine of a high molecular weight hydrocarbon, said salt being present in sufficient amount to prevent any appreciable adhesion of the dried films to each other and in insufficient amount to impair the transparency of said films.

10. The method comprising regenerating cellulose film from an aqueous solution, and treating said film with an aqueous solution of a water-soluble salt of a normally solid primary alkyl amine of a high molecular weight hydrocarbon, said salt being present in sufficient amount to prevent any appreciable adhesion of the dried films to each other and in insufficient amount to impair the transparency of said films.

11. The method comprising regenerating cellulose film from an aqueous solution, and treating said film with an aqueous solution of a softener and a water-soluble salt of a normally solid primary alkyl amine of a high molecular weight hydrocarbon, said salt being present in sufficient amount to prevent any appreciable adhesion of the dried films to each other and in insufficient amount to impair the transparency of said films.

DONALD E. DREW.